(12) United States Patent
Okamoto et al.

(10) Patent No.: US 8,958,531 B2
(45) Date of Patent: Feb. 17, 2015

(54) X-RAY WAVEGUIDE

(75) Inventors: Kohei Okamoto, Yokohama (JP); Atsushi Komoto, Moriya (JP); Wataru Kubo, Inagi (JP); Hirokatsu Miyata, Hadano (JP); Takashi Noma, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/643,169

(22) PCT Filed: May 20, 2011

(86) PCT No.: PCT/JP2011/062158
§ 371 (c)(1),
(2), (4) Date: Oct. 24, 2012

(87) PCT Pub. No.: WO2011/152293
PCT Pub. Date: Dec. 8, 2011

(65) Prior Publication Data
US 2013/0039477 A1 Feb. 14, 2013

(30) Foreign Application Priority Data

Jun. 2, 2010 (JP) .................................. 2010-127339
Apr. 28, 2011 (JP) .................................. 2011-101309

(51) Int. Cl.
*G21K 1/00* (2006.01)
*G21K 1/06* (2006.01)
*B82Y 10/00* (2011.01)

(52) U.S. Cl.
CPC ................ *G21K 1/062* (2013.01); *B82Y 10/00* (2013.01)
USPC ........... 378/145; 385/123; 385/126; 385/129; 385/132

(58) Field of Classification Search
CPC .. G21K 2201/061; B82Y 20/00; G02B 6/032; G02B 6/02; G02B 6/02347; G02B 6/036; G02B 6/1225
USPC ................... 378/145; 385/123, 126, 129, 132
See application file for complete search history.

(56) References Cited

U.S. PATENT DOCUMENTS 3,893,231 A 7/1975 Anderson ........................ 29/600
6,452,184 B1 9/2002 Taskar et al. .................. 250/367
(Continued)

FOREIGN PATENT DOCUMENTS

KR 2009-0096771 9/2009

OTHER PUBLICATIONS

F. Pfeiffer et al., "X-Ray Waveguides with Multiple Guiding Layers", *Physical Review B*, vol. 62, No. 24, pp. 16939-16943 (Dec. 15, 2000), XP002463298.

T. Salditt et al., "High-Transmission Planar X-Ray Waveguides", *Phys. Rev. Lett.*, vol. 100, No. 18, pp. 184801-1-184801-4 (May 9, 2008), XP55000549.

(Continued)

*Primary Examiner* — Michael Maskell
(74) *Attorney, Agent, or Firm* — Fitzpatrick, Cella, Harper & Scinto (57) ABSTRACT

To provide an X-ray waveguide which: shows a small propagation loss of an X-ray; has a waveguide mode with its phase controlled; does not deteriorate owing to oxidation; and can be easily produced, an X-ray waveguide, including: a core for guiding an X-ray in such a wavelength band that a real part of the refractive index of a material is 1 or less; and a cladding for confining the X-ray in the core, in which: the core has a one-dimensional periodic structure containing multiple materials having different real parts of the refractive index; the multiple materials include one of an organic material, a gas, and a vacuum, and an inorganic material; and the core and the cladding are formed so that the critical angle for total reflection at an interface between the core and the cladding is larger than a Bragg angle resulting from a periodicity of the one-dimensional periodic structure, is realized.

7 Claims, 7 Drawing Sheets

(56) References Cited

U.S. PATENT DOCUMENTS

| | | | | |
|---|---|---|---|---|
| 8,611,503 | B2* | 12/2013 | Okamoto et al. | 378/145 |
| 2006/0078263 | A1* | 4/2006 | Kittaka et al. | 385/129 |
| 2011/0299661 | A1 | 12/2011 | Okamoto et al. | 378/145 |
| 2011/0299662 | A1 | 12/2011 | Okamoto et al. | 378/145 |
| 2013/0058461 | A1 | 3/2013 | Okamoto et al. | 378/145 |
| 2013/0070905 | A1 | 3/2013 | Komoto et al. | 378/145 |

OTHER PUBLICATIONS

I.R. Prudnikov, "X-Ray Waveguides Based on Bragg Scattering of Multi-Layers", *Physical Review B*, vol. 67, No. 23, p. 233303-1 through 233303-4 (Jun. 10, 2003).

Office Action issued on Sep. 3, 2014, in counterpart Chinese patent application 201180026118.6, with translation.

* cited by examiner

X-RAY WAVEGUIDE

TECHNICAL FIELD

The present invention relates to an X-ray waveguide, in particular, an X-ray waveguide used for an X-ray optical system in an X-ray optical system, an X-ray imaging technology, an X-ray exposure technology, or the like.

BACKGROUND ART

When an electromagnetic wave having a short wavelength of several tens of nanometers or less is dealt with, a difference in refractive index for any such electromagnetic wave between different materials is extremely small, specifically, $10^{-4}$ or less, and thus, for example, a total reflection angle becomes extremely smaller. For controlling such electromagnetic wave including an X-ray, a large-scale spatial optical system is usually used. As main parts of which the spatial optical system is formed, there is given a multilayer mirror obtained by alternately laminating materials having different refractive indices, and this multilayer mirror is playing various roles such as beam shaping, spot size conversion, and wavelength selection.

A conventional X-ray waveguide such as a polycapillary propagates, in contrast to such mainstream spatial optical system, an X-ray by confining the X-ray in itself. Researches have been recently conducted on—ray waveguides, which propagate X-ray by confining the X-ray in a thin film or a multilayer film with a view to reducing the size, and improving the performance, of optical systems.

Specifically, researches have been conducted on, for example, multiple thin-film X-ray waveguides each formed so that an X-ray is confined by total reflection in each waveguide's core.(see NPL 1), and a thin-film waveguide of such a shape that a waveguiding layer is interposed between two layers of one-dimensional periodic structures (see NPL 2).

CITATION LIST

Non Patent Literature

NPL 1: "Physical Review B", Volume 62, Number 24, p. 16939 (2000-II)

NPL 2: "Physical Review B", Volume 67, Number 23, p. 233303 (2003)

SUMMARY OF INVENTION

Technical Problem

In NPL 1, however, the propagation loss of an X-ray increases because each cladding layer is formed of a material having a large electron density in order that the X-ray may be confined in each basic waveguiding layer that forms a periodic structure by total reflection. Problems such as the oxidation degradation of a waveguide exist because the selectivity of kinds of materials for use in the cladding is low, and most of the materials are readily oxidized. Further, the process of forming the multilayer by laminating any such materials requires time.

In addition, NPL 2 has proposed an X-ray waveguide that confines X-ray in the core by Bragg reflection at a multilayer film provided as a cladding. However, the multilayer film is formed of Ni and C, and the lamination of a sufficient number of layers of such materials requires extremely long time and labor. Further, the absorption loss of the X-ray in the multilayer film increases because a metal material that absorbs the X-ray to a large extent is used. In addition, such a problem that the waveguide degrades owing to oxidation exists.

The present invention has been made in view of such conventional problems as described above, and an object of the present invention is to provide an X-ray waveguide which: shows a small propagation loss of an X-ray; has a waveguide mode with its phase controlled; does not deteriorate owing to oxidation; and can be easily produced.

Solution to Problem

To solve the above problems, the inventors have made an X-ray waveguide, including: a core for guiding X-ray in such a wavelength band that a real part of the refractive index of materials is 1 or less; and a cladding for confining the X-ray in the core, in which: the core has a one-dimensional periodic structure containing multiple materials having different real parts of the refractive index; one of the multiple materials is any of organic material, a gas, and a vacuum, and another one of the materials is inorganic material; and the core and the cladding are formed so that the critical angle for total reflection at an interface between the core and the cladding is larger than a Bragg angle resulting from a periodicity of the one-dimensional periodic structure.

Advantageous Effects of Invention

According to the present invention, there can be provided an X-ray waveguide which: shows a small propagation loss of an X-ray; has a waveguide mode with its phase controlled; does not deteriorate owing to oxidation; and can be easily produced.

Further features of the present invention will become apparent from the following description of exemplary embodiments with reference to the attached drawings.

DESCRIPTION OF EMBODIMENTS

Hereinafter, the present invention is described in detail.

Figure 1:
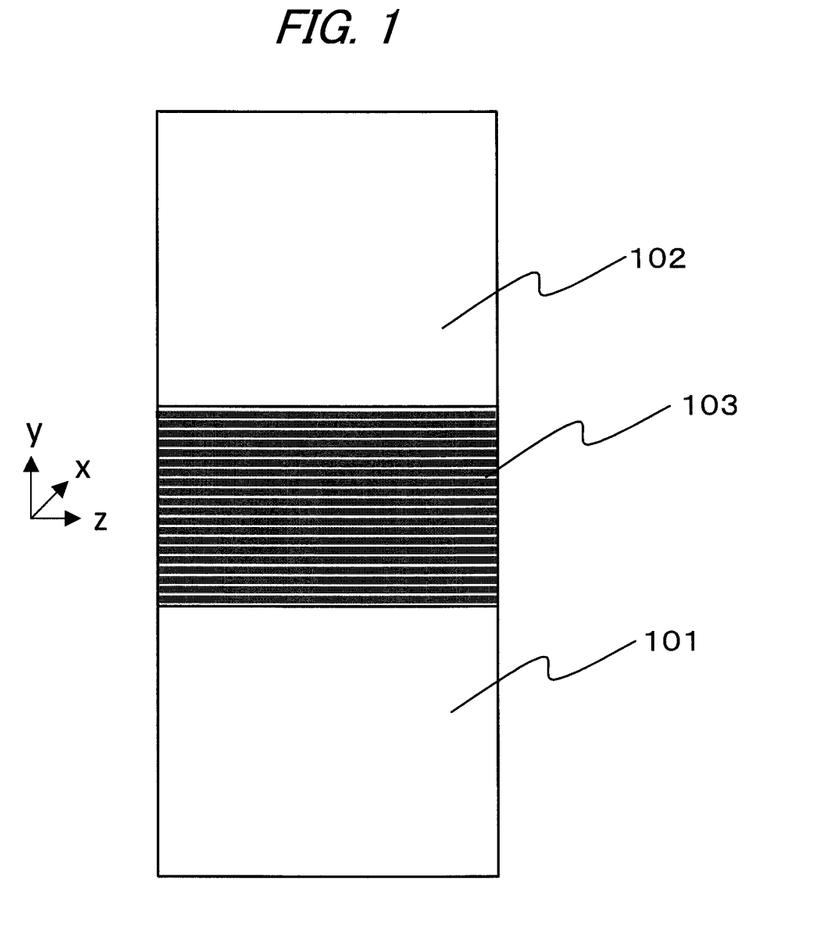
FIG. 1 is a schematic view illustrating an embodiment of an X-ray waveguide of the present invention.

FIG. 1 is a schematic view illustrating an embodiment of an X-ray waveguide of the present invention. The X-ray waveguide according to the present invention is an X-ray waveguide formed of: a core 103 for guiding an X-ray in such a wavelength band that the real part of the refractive index of a material is 1 or less; and claddings 101 and 102 for confining the X-ray in the core. In addition, the X-ray waveguide has the following features. The core 103 is formed of a one-dimensional periodic structure in which multiple materials having different real parts of the refractive index are periodically laminated in a one-dimensional direction. Further, at least one kind of material out of the multiple materials is any of organic material, a gas, and a vacuum, and at least one kind of material out of the materials is an inorganic material that is continuous in the in-plane direction of the one-dimensional periodic structure. In addition, the critical angle for total reflection at an interface between the core and each of the claddings is larger than a Bragg angle resulting from the periodicity of the one-dimensional periodic structure.

The term "X-ray" as used in the present invention refers to electromagnetic waves in such a wavelength band that the real part of the refractive index of a material is 1 or less. Specifically, the term "X-ray" as used in the present invention refers to electromagnetic waves, each of which is having a wavelength of 100 nm or less including extreme ultraviolet light (EUV light).

Further, the following fact has been known. Because an electromagnetic wave having such short wavelength has so high a frequency that an electron in the outermost shell of a material cannot respond to the frequency, the real part of the refractive index of the material for an X-ray is smaller than 1 unlike the frequency band of an electromagnetic wave (visible light or infrared light) having a wavelength longer than that of ultraviolet light. As represented in the following formula (1), such refractive index n of a material for an X-ray is generally represented by using a decrement $\delta$ of a real part from 1 and an imaginary part $\beta'$ related to absorption.

[Math. 1]

$$n = 1 - \delta - i\beta' = n' - i\beta' \qquad (1)$$

Because the $\delta$ is proportional to an electron density $\rho_e$ of the material, the real part of the refractive index reduces as the electron density of the material increases. In addition, the real part of the refractive index n' is 1-$\delta$. Further, the $\rho_e$ is proportional to an atomic density $\rho_a$ and an atomic number Z. As described above, the refractive index of a material for an X-ray is represented in terms of a complex number. In the description, the real part of the complex number is referred to as a "real part of the refractive index" or a "real part of the refractive index", and the imaginary part of the complex number is referred to as a "refractive index imaginary part" or an "imaginary part of the refractive index".

The case where a real part of the refractive index for an X-ray becomes maximum is the case where the X-ray propagates in a vacuum. Under a general environment, however, the real part of the refractive index of air for nearly all materials except gases becomes maximum. In the description, the term "material" is applied to a vacuum as well.

The present invention is characterized in that: the core is provided with a one-dimensional periodic structure formed of multiple materials having different real parts of the refractive index; at least one kind of material out of the multiple materials is any of organic material, a gas such as air, and a vacuum; and at least another one kind of material out of the materials is a continuous inorganic material. The term "multiple materials having different real part of the refractive index" as used in the present invention refers to two or more kinds of materials having different electron densities in many cases.

The propagation loss of an X-ray due to absorption can be reduced because one kind of the materials of which the one-dimensional periodic structure of the core is formed is an organic material that absorbs the X-ray to a small extent. In addition, the term "continuous inorganic material" refers to a material in which inorganic elements such as Si and Ti are bonded in a film fashion by a covalent bond through O or the like such as $SiO_2$ or $TiO_2$, or a material in which atoms are bonded in a film fashion by a metal bond such as Au or Pt. Such continuous inorganic material can improve the strength of the one-dimensional periodic structure itself. Further, the use of an oxide such as $SiO_2$ or $TiO_2$ can obviate the deterioration or structural change of the X-ray waveguide due to oxidation, thereby resulting in improved durability.

In the present invention, the one-dimensional periodic structure can be formed as a multilayer film. In this case, a method of laminating the inorganic material that is an oxide is, for example, vapor deposition or a sputtering method. A multilayer film in the present invention is a one-dimensional periodic structure obtained by alternately laminating such inorganic material and organic material in a one-dimensional direction. The inorganic material in the unit structures that form the periodic structure is continuously formed in the in-plane direction of the multilayer film, but is not needed to be continuous between the respective unit structures.

Further, the multilayer film formed of such material is, for example, a lamellar film as a mesostructured film produced by employing a sol-gel process. The multilayer film preferably includes a lamellar film as a mesostructure. The term "lamellar film" as used herein refers to a mesostructured film having a lamellar structure. The term "mesostructured film" refers to an organic-inorganic hybrid material film formed by the self-assembly of a surfactant. Among available mesostructured films having various meso-scale structural periodicities, a mesostructured film of such a lamellar structure that sheets (thin films) of an organic component and an inorganic component are laminated is suitably used in the present invention. Representative examples of the inorganic component of such mesostructured film include oxides such as $SiO_2$, $TiO_2$, $SnO_2$, and $ZrO_2$. Such mesostructured film of the lamellar structure can be formed on a substrate by an approach such as the sol-gel process. The structural period of the mesostructured film of the lamellar structure can be appropriately adjusted to a desired value depending on, for example, the kind and concentration of the surfactant to be used, and reaction conditions. Since the mesostructured film of the lamellar structure forms the one-dimensional periodic structure in a self-organizing fashion in one step, the time and labor of a production step for the film can be markedly curtailed.

In the present invention, the mesostructured film is a film of periodic structure having a structural period of 2 to 50 nm. The lamellar structure is a layered structure formed of two different kinds of materials, and the two kinds of materials are formed of a material mainly formed of an inorganic component and a material mainly formed of an organic component. The material mainly formed of the inorganic component and the material mainly formed of the organic component may be bonded to each other as required. A product in which the materials are bonded to each other is specifically, for example, a mesostructure prepared from a siloxane compound to which an alkyl group is bonded.

A material for the inorganic material mainly formed of the inorganic component, which is not particularly limited, is, for example, an inorganic oxide from the viewpoint of produceability and such a viewpoint that the periodic structure is formed of materials having different real parts of the refractive index. Examples of the inorganic oxide include silicon oxide, tin oxide, zirconia oxide, titanium oxide, niobium oxide, tantalum oxide, aluminum oxide, tungsten oxide, hafnium oxide, and zinc oxide. The surface of a wall part may be modified as necessary. For example, the surface of the wall part may be modified with a hydrophobic molecule for inhibiting the adsorption of water.

The organic material mainly formed of the organic component, which is not particularly limited, is, for example, a surfactant or a material in which a site having a function of forming a molecular assembly is bonded to a material of which a wall part is formed or a precursor for the material of which a wall part is formed. Examples of the surfactant include ionic and nonionic surfactants. The ionic surfactant is, for example, a halide salt of a trimethylalkylammonium ion. The chain length of the alkyl chain is, for example, 10 to 22 in terms of a carbon number. Examples of the nonionic surfactant include surfactants, each of which is containing polyethylene glycol as a hydrophilic group. Specific examples of the surfactants, each of which is containing polyethylene glycol as a hydrophilic group include polyethylene glycol alkyl ether and a polyethylene glycol-polypropylene glycol-polyethylene glycol block copolymer. The chain length of the alkyl chain of the polyethylene glycol alkyl ether is, for example, 10 to 22 in terms of a carbon number, and the number of repetitions of the polyethylene glycol is, for example, 2 to 50. The structural period can be changed by changing the hydrophobic group or hydrophilic group. In general, a structural period can be extended by making a hydrophobic group or hydrophilic group large. The material mainly formed of the organic component may contain water, an organic solvent, a salt, or the like as required, or as a result of a material to be used or a step. Examples of the organic solvent include an alcohol, ether, and a hydrocarbon.

Next, a method of producing the mesostructured film is described.

Although the method of producing the mesostructured film is not particularly limited, the film is produced by, for example, adding a precursor for an inorganic oxide to a solution of an amphipathic material (especially a surfactant) that functions as an assembly to perform film formation so that a reaction for producing the inorganic oxide may be advanced.

In addition, an additive for adjusting a structural period as well as the surfactant may be added. The additive for adjusting a structural period is, for example, a hydrophobic material. Examples of the hydrophobic material include alkanes and aromatic compounds free of hydrophilic groups. The hydrophobic material is specifically, for example, octane.

Examples of the precursor for the inorganic oxide include an alkoxide and a chloride of silicon or a metal element. More specific examples thereof include an alkoxide and a chloride of Si, Sn, Zr, Ti, Nb, Ta, Al, W, Hf, or Zn. Examples of the alkoxide include a methoxide, an ethoxide, a propoxide, which may be partly substituted with an alkyl group.

Examples of the film-forming method include a dip coating method, a spin coating method, and a hydrothermal synthesis method.

Further, special examples of the one-dimensional periodic structure in the present invention include a mesoporous material and a mesoporous film whose pores are filled with an organic material and the like. Each of those mesoporous films is such that pores or pores filled with the organic material are placed in an inorganic material in a two- or three-dimensional direction. However, any such film serves as the one-dimensional periodic structure when attention is paid to a refractive index or density at which an average refractive index has a periodic distribution in a one-dimensional direction depending on a material out of which, and a condition under which, the film is produced. In particular, when the inside of each pore is filled with a gas such as air or is evacuated to a vacuum, a difference in refractive index between the materials of which any such film is formed can be increased. In addition, the propagation loss of an X-ray can be reduced. Hereinafter, such mesoporous films are described.

(A) Mesoporous film whose pores are hollow

The mesoporous film is a porous material having a pore diameter of 2 to 50 nm, and a material for a wall part, which is not particularly limited, is, for example, an inorganic oxide in terms of produceability. Examples of the inorganic oxide include silicon oxide, tin oxide, zirconia oxide, titanium oxide, niobium oxide, tantalum oxide, aluminum oxide, tungsten oxide, hafnium oxide, and zinc oxide. The surface of the wall part may be modified as necessary. For example, the surface of the wall part may be modified with a hydrophobic molecule for inhibiting the adsorption of water.

Although a method of preparing the mesoporous film is not particularly limited, the film can be prepared by, for example, the following method. A precursor for the inorganic oxide is added to a solution of an amphipathic material whose assembly functions as a template to perform film formation so that a reaction for producing the inorganic oxide may be advanced. After that, template molecules are removed so that the porous material may be obtained.

The amphipathic material, which is not particularly limited, is suitably a surfactant. Examples of the surfactant molecule include ionic and nonionic surfactants. The ionic surfactant is, for example, a halide salt of a trimethylalkylammonium ion. The chain length of the alkyl chain is, for example, 10 to 22 in terms of a carbon number. Examples of the nonionic surfactant include surfactants, each of which is containing polyethylene glycol as a hydrophilic group. Specific examples of the surfactants, each of which is containing polyethylene glycol as a hydrophilic group include a polyethylene glycol alkyl ether and a polyethylene glycol-polypropylene glycol-polyethylene glycol block copolymer. The chain length of the alkyl chain of the polyethylene glycol alkyl ether is, for example, 10 to 22 in terms of a carbon number, and the number of repetitions of the polyethylene glycol is, for example, 2 to 50. The structural period can be changed by changing the hydrophobic group or hydrophilic group. In general, a pore diameter can be extended by making a hydrophobic group or hydrophilic group large. In addition, an additive for adjusting a structural period as well as the surfactant may be added. The additive for adjusting a structural period is, for example, a hydrophobic material. Examples of the hydrophobic material include alkanes and aromatic compounds free of hydrophilic groups. The hydrophobic material is specifically, for example, octane.

Examples of the precursor for the inorganic oxide include an alkoxide and a chloride of silicon or a metal element. More specific examples thereof include an alkoxide and a chloride of Si, Sn, Zr, Ti, Nb, Ta, Al, W, Hf, or Zn. Examples of the alkoxide include a methoxide, an ethoxide, a propoxide, which may be partly substituted with an alkyl group.

Examples of the film-forming method include a dip coating method, a spin coating method, and a hydrothermal synthesis method. Examples of the method of removing the template molecules include calcination, extraction, ultraviolet irradiation, and ozonation.

(B) Rmesoporous film whose pores are mainly filled with organic compound

Any one of the same materials as those described in the section (A) can be used as a material for a wall part. The material with which each pore is filled is not particularly limited as long as the material is mainly formed of an organic compound. The term "mainly" means that a volume ratio of the organic compound to the material is 50% or more. The organic compound is, for example, a surfactant or a material in which a site having a function of forming a molecular assembly is bonded to the material of which a wall part is formed or a precursor for the material of which a wall part is formed. Examples of the surfactant include the surfactants described in the section (A). In addition, examples of the material in which the site having a function of forming a molecular assembly is bonded to the material of which a wall part is formed or the precursor for the material of which a wall part is formed include an alkoxysilane having an alkyl group and an oligosiloxane compound having an alkyl group. The chain length of the alkyl chain is, for example, 10 to 22 in terms of a carbon number.

The inside of each pore may contain water, an organic solvent, a salt, or the like as required, or as a result of a material to be used or a step. Examples of the organic solvent include an alcohol, ether, and a hydrocarbon.

A method of preparing the mesoporous film whose pores are mainly filled with the organic compound, which is not particularly limited, is, for example, a step before the template removal of the method of preparing the mesoporous film described in the section (A).

The X-ray waveguide of the present invention confines an X-ray in the core as the one-dimensional periodic structure by total reflection at an interface between the core and each of the claddings to form a waveguide mode, thereby propagating the X-ray. In addition, the X-ray waveguide is characterized in that the critical angle for total reflection at the interface between the core and the cladding is larger than the Bragg angle resulting from the periodicity of the one-dimensional periodic structure.

Figure 6:
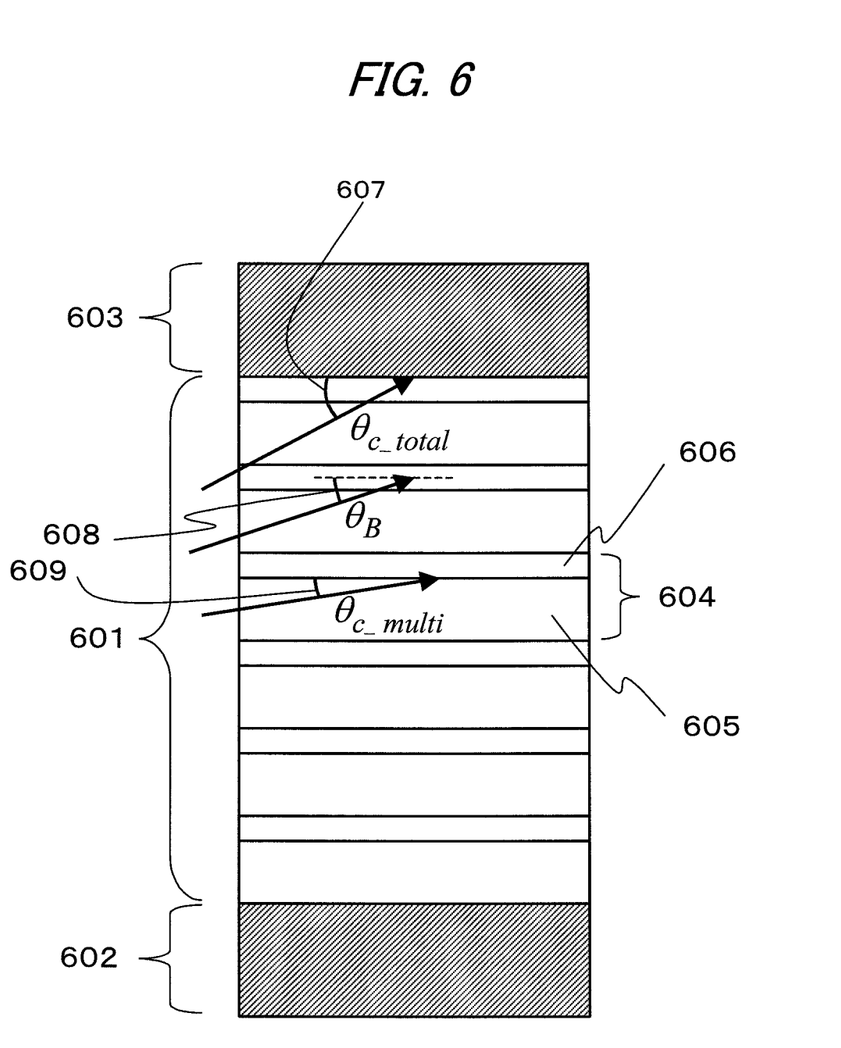
FIG. 6 is a diagram for illustrating the three representative angles, critical angle for total reflection at the interface between the cladding and the core, Bragg angle, and the critical angle for total reflection at the interface between the respective layers forming the periodic structure.

An X-ray waveguide illustrated in FIG. 6 is of such a form that a core 601 is interposed between a cladding 602 and a cladding 603, and unit structures 604, each of which is formed of a layer 606 of a material having a low real part of the refractive index and a layer 605 of a material having a high real part of the refractive index are laminated to form the core 601. The critical angle for total reflection 607 at an interface between each cladding and the core, and a Bragg angle 608 are represented therein. Further, the critical angle for total reflection 609 at a material interface in each unit structure, in a case when the one-dimensional periodic structure is a multilayer film, is also represented.

FIG. 6 exemplifies the critical angle for total reflection $\theta_{C\text{-}total}$ at the interface between each cladding and the core, the critical angle for total reflection $\theta_{C\text{-}multi}$ at an interface between the respective layers that form each unit structure in the multilayer film, and a Bragg angle $\theta_B$ resulting from the periodicity of the multilayer film. In the description, those angles are each measured from a direction parallel to a film surface. An arrow in the figure indicates the travelling direction of an X-ray.

When the real part of the refractive index of the material on a cladding side at the interface between each cladding and the core is represented by $n_{clad}$ and the real part of the refractive index of the material on a core side at the interface is represented by $n_{core}$, the critical angle for total reflection $\theta_{C\text{-}total}$ (°) from the direction parallel to the film surface is represented by the following formula (2) on condition that the $n_{clad}$ is smaller than the $n_{core}$.

[Math. 2]

$$\theta_{c\text{-}total} = \frac{180}{\pi}\arccos\left(\frac{n_{clad}}{n_{core}}\right) \quad (2)$$

When the period of the one-dimensional periodic structure of the core is represented by d and the average real part of the refractive index of the one-dimensional periodic structure as the core is represented by $n_{avg}$, the Bragg angle $\theta_B$ (°) is roughly defined as represented by the following formula (3) irrespective of the presence or absence of multiple diffraction in the core.

[Math. 3]

$$\theta_B \approx \frac{180}{\pi}\arcsin\left(\frac{1}{n_{avg}}m\frac{\lambda}{2d}\right) \quad (3)$$

In the formula, m represents a natural number, and λ represents the wavelength of an X-ray.

The physical property parameters of the materials of which the X-ray waveguide of the present invention is formed, a structure parameter of the waveguide, and the wavelength of the X-ray are designed so as to satisfy the following formula (4).

Math. 4

$$\theta_B < \theta_{c\text{-}total} \quad (4)$$

Figure 7:
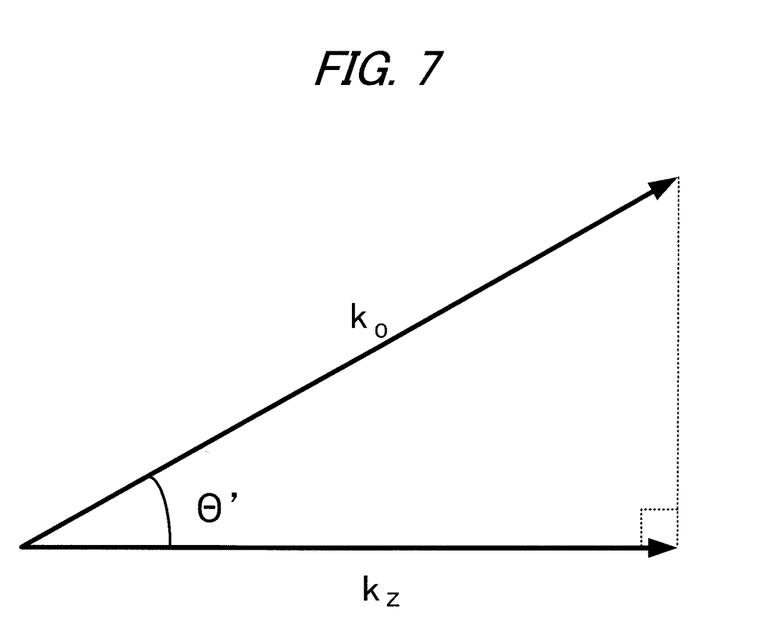
FIG. 7 is a diagram for illustrating an effective propagation angle.

As a result, a waveguide mode having an effective propagation angle of, for example, around the Bragg angle resulting from the one-dimensional periodicity of the core as the one-dimensional periodic structure can be caused to contribute to the propagation of an X-ray by being always confined in the core with the claddings. Here, the effective propagation angle θ'(°) in the description is an angle measured from the direction parallel to the film surface, and is represented by the following formula (5) with a wave vector (propagation constant) $k_z$, in the guiding direction of X-ray of waveguide mode of the waveguide mode and a wave vector $k_0$ in a vacuum of the waveguide mode. Because the $k_z$ is constant at an interface between the respective layers by virtue of a condition of continuity, as illustrated in FIG. 7, the effective propagation angle θ'(°) represents an angle defined between the propagation constant $k_z$ of the fundamental wave of the waveguide mode and the wave vector $k_0$ in a vacuum of the fundamental wave at which the fundamental wave of the waveguide mode travels in a vacuum. The angle is used in the following description because the angle can be considered to approximately represent the angle at which the fundamental wave of the waveguide mode propagates in the core.

[Math. 5]

$$\theta' = \frac{180}{\pi}\arccos\left(\frac{k_z}{k_0}\right) \quad (5)$$

The X-ray waveguide of the present invention can be such a waveguide as described below. The one-dimensional periodic structure is formed as a multilayer film, and the multilayer film is formed of such multiple materials that the critical angle for total reflection at an interface between the respective layers that form the multilayer film is smaller than the Bragg angle resulting from the periodicity of the multilayer film. In reality, it is preferable that the Bragg angle is determined by X-ray diffraction measurements or the like.

In the multilayer film that forms the core of the present invention, which is obtained by periodically laminating films of multiple materials having different real parts of the refractive index, the critical angle for total reflection based on a difference in real part of the refractive index is present at an interface between adjacent films. When the number of kinds of materials having different real parts of the refractive index that form the multilayer film is three or more, multiple critical angle for total reflections may exist, and are collectively referred to as the "$\theta_{C\text{-}multi}$ (°)".

[Math. 6]

$$\theta_{C\_multi} < \theta_B \qquad (6)$$

As represented in the above-mentioned formula (6), when the critical angle for total reflection in the multilayer film is smaller than the Bragg angle resulting from the periodicity of the multilayer film, an X-ray incident on an interface in the multilayer film at an angle equal to or larger than the vicinity of the Bragg angle does not undergo total reflection, but undergoes partial reflection or refraction. Because the multilayer film is formed of multiple, periodically laminated films having different real parts of the refractive index, multiple interfaces also exist in the direction in which the films are laminated, and the X-ray in the multilayer film repeatedly undergoes reflection and refraction at these interfaces. Such repetition of the reflection and refraction of the X-ray in the multilayer film in the present invention causes multiple interference because the multilayer film is of a one-dimensional periodic structure. As a result, an X-ray having such a condition as to be capable of resonating with the periodic structure of the multilayer film, that is, a propagation mode that can exist in the multilayer film is formed. Thus, a waveguide mode is formed in the core of the X-ray waveguide structure of the present invention. The mode is referred to as a "periodic resonant waveguide mode". In a special case where the one-dimensional periodic structure is formed of a mesoporous film, the $\theta_{C\text{-}multi}$ does not exist. Accordingly, the formula (6) is satisfied in this case as well.

Such periodic resonant waveguide modes, each of which has an effective propagation angle, and the effective propagation angle of the periodic resonant waveguide mode appears in the vicinity of the Bragg angle of the multilayer film. Each periodic resonant waveguide mode is referred to as a "periodic resonant waveguide mode" in the description because the mode is a mode that resonates with the periodicity of the periodic structure. The mode corresponds to a propagation mode that satisfies the lowest-order band when the multilayer film is considered as a one-dimensional photonic crystal having an infinite number of periods, and the propagation mode is confined by the total reflection at the interface between each cladding and the core.

Because the number of periods of an actual one-dimensional periodic structure is finite, its photonic band structure deviates from the photonic band structure of a one-dimensional periodic structure having an infinite period. However, a characteristic of a waveguide mode approaches that on a photonic band having an infinite period as the number of periods increases. In addition, the Bragg reflection at the Bragg angle, which is an angle somewhat larger than the effective propagation angle of the periodic resonant waveguide mode, is caused by an effect of a photonic band gap based on the periodicity. In the case where the effective propagation angle of a waveguide mode is considered on condition that the energy of an X-ray is constant, the reflection is caused by the formation of two waveguide modes, each of which has an angle close to an angle corresponding to the angle of a edge of the photonic band gap when the edge is interpreted in terms of an angle. The waveguide mode having the lower effective propagation angle out of those modes is a lowest-order periodic resonant waveguide mode. In the spatial distribution of the electric field intensity of the periodic resonant waveguide mode, the number of antinodes of the electric field intensity basically coincides with the number of periods of the multilayer film. The number of antinodes of a higher-order periodic resonant waveguide mode having an effective propagation angle corresponding to a higher-order Bragg angle is basically a multiple of n of the number of periods of the one-dimensional periodic structure (where n represents a natural number of 2 or more).

In addition, waveguide modes, each of which has an angle except the effective propagation angle of any such periodic resonant waveguide mode as described above can also exist in a multilayer film having a finite number of periods. Those modes are not periodic resonant waveguide modes, but are waveguide modes that exist when the entire multilayer film as the core is considered as a uniform medium whose real part of the refractive index is averaged, and their characteristics are basically affected by the periodicity of the multilayer film to a small extent. On the other hand, in a periodic resonant waveguide mode realized by the configuration of the X-ray waveguide of the present invention, an electric field converges on the center of the core as the multilayer film to a larger extent and the amount of evanescent field in a cladding decreases as the number of periods of the periodic structure increases. As a result, the propagation loss of an X-ray reduces. In addition, the envelope of an electric field intensity distribution is of a shape biased toward the center of the core, and hence a loss due to the evanescent field that causes the absorption loss in the cladding reduces. Further, the phase of the periodic resonant waveguide mode to be used in the X-ray waveguide of the present invention is matched in a direction in which the periodicity of the one-dimensional periodic structure is high, in other words, in the direction perpendicular to the interface between each cladding and the core and to guiding direction of X-ray of waveguide mode, and hence can have spatial coherence. The phrase "phase of the waveguide mode is matched" as used in the present invention refers not only to that a phase difference of electromagnetic field over the length of core in a direction perpendicular to the surface between the cladding and the core is zero but also to that the phase difference of electromagnetic field periodically changes between $-\pi$ and $+\pi$ in correspondence with the spatial refractive index distribution of the periodic structure. The periodic resonant waveguide mode in the present invention is such that the phase of an electric field changes between $-\pi$ and $+\pi$ at the same period as that of the periodic structure in the direction perpendicular to the waveguiding direction. Waveguiding direction means the guiding direction of X-ray of a waveguide mode.

As illustrated in FIG. 1, an embodiment of the X-ray waveguide of the present invention is of such a configuration that the core 103 is interposed between the claddings 101 and 102. An X-ray is confined in the core by the total reflection at the interface between each cladding and the core.

The core 103 can be, for example, a lamellar film (mesostructured film of a lamellar structure) produced from a solution containing a surfactant and a precursor for the inorganic material by a sol-gel process. The lamellar film is obtained by alternately laminating 50 periods, each of which consists of $SiO_2$ having a thickness of about 2 nm and the organic material having a thickness of about 8 nm, and has a period of about 10 nm. In addition, Au is used in each of the claddings 101 and 102. It should be noted that in the present invention, the number of periods of the periodicity of the multilayer film in which the multiple materials are periodically laminated is preferably 20 or more.

In this case, the critical angle for total reflection at each layer in the core is about 0.08°, and the Bragg angle based on the periodicity of the core determined from the formula (3) is about 0.21°. As a result, the condition represented by the formula (6), i.e., $\theta_{C\text{-}multi} < \theta_B$ is satisfied. Accordingly, an X-ray having a propagation angle around the Bragg angle can undergo multiple interference, and the mode of a fundamental wave having an angle around the Bragg angle can be formed. In addition, the critical angle for total reflection $\theta_{C\text{-}total}$ at the interface between each cladding and the core determined from the formula (2) is about 0.25°. Because the $\theta_B$ based on the periodicity of the core is about 0.21°, the condition represented by the formula (4), i.e., the relationship of $\theta_B < \theta_{C\text{-}total}$ is satisfied. As a result, the X-ray can be confined in the core by the total reflection at the interface between each cladding and the core. The structure can form a periodic resonant waveguide mode because the structure can satisfy the conditions represented by the formula (6) and the formula (4).

Figure 2:
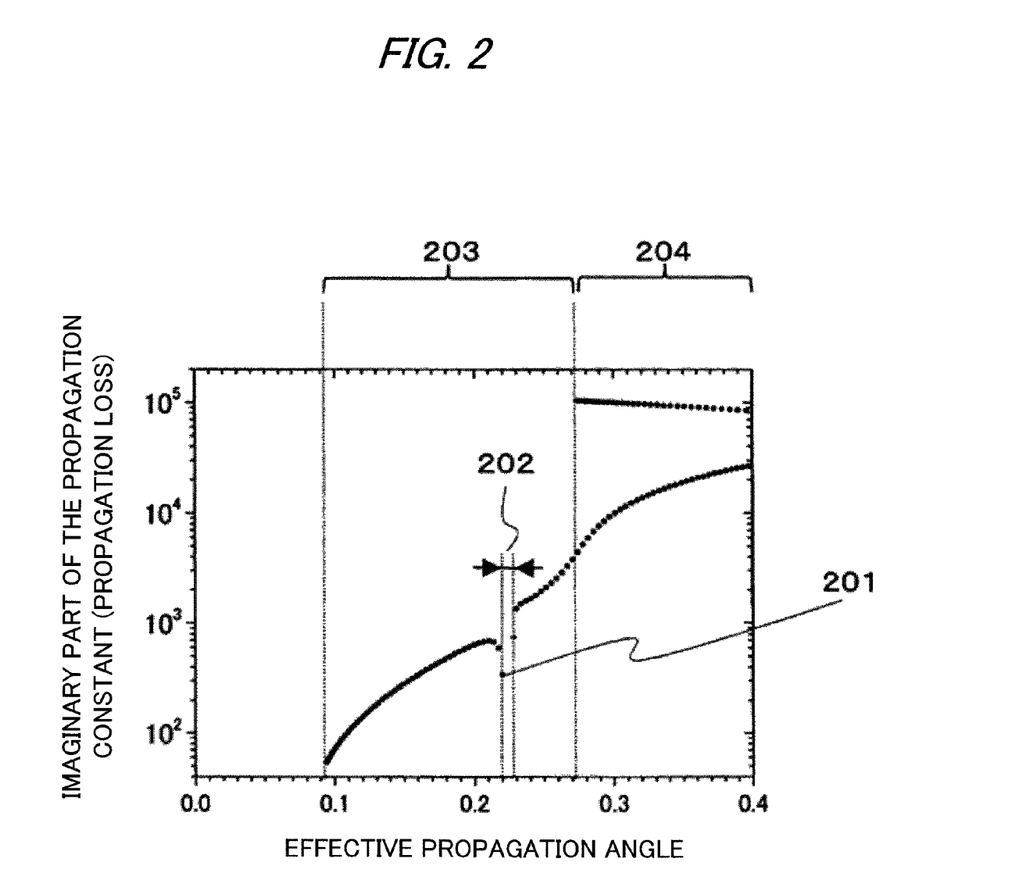
FIG. 2 is a view illustrating the effective propagation angle dependence of the loss of a propagation mode.

A view illustrated in FIG. 2 is obtained by determining, through numerical calculation, a relationship between the effective propagation angle and propagation constant of a waveguide mode formed in the core of the X-ray waveguide of FIG. 1 for an X-ray having an energy of 17.5 keV. In FIG. 2, the axis of abscissa indicates the effective propagation angle, and the axis of ordinate indicates the imaginary part of the propagation constant. In other words, FIG. 2 illustrates the propagation angle dependence of the loss of a mode that contributes to propagation. This is because the imaginary part of the propagation constant is a part involved in the attenuation of the waveguide mode and can be considered to represent the loss of the waveguide mode. In the figure, an angle corresponding to a boundary between regions 203 and 204 is the critical angle for total reflection at the interface between the core and each cladding. The region 203 represents a propagation mode having an effective propagation angle smaller than the critical angle for total reflection at the interface between each cladding and the core, and is an angle range representing a waveguide mode showing a small loss. The region 204 represents a radiation mode having an effective propagation angle larger than the critical angle for total reflection at the interface between each cladding and the core, and showing a large loss.

In addition, in the region 203 having an effective propagation angle smaller than the critical angle for total reflection, as can be shown by a lowest-order periodic resonant waveguide mode 201, it can be found that the loss of the mode is so small that the mode is an effective waveguide mode. No mode exists in an angle region 202 slightly larger than the effective propagation angle of the waveguide mode 201, and the region is a photonic band gap responsible for Bragg reflection at the multilayer film. Here, angles around the critical angle for total reflection and the Bragg angle obtained from FIG. 2 deviate from the critical angle for total reflection and the Bragg angle obtained from the formula (2) and the formula (4). This is because in an actual structure, an optical path length and the like differ from those of a hypothetical structure owing to the existence of evanescent field in the cladding and complex interference of an X-ray.

Figure 3:
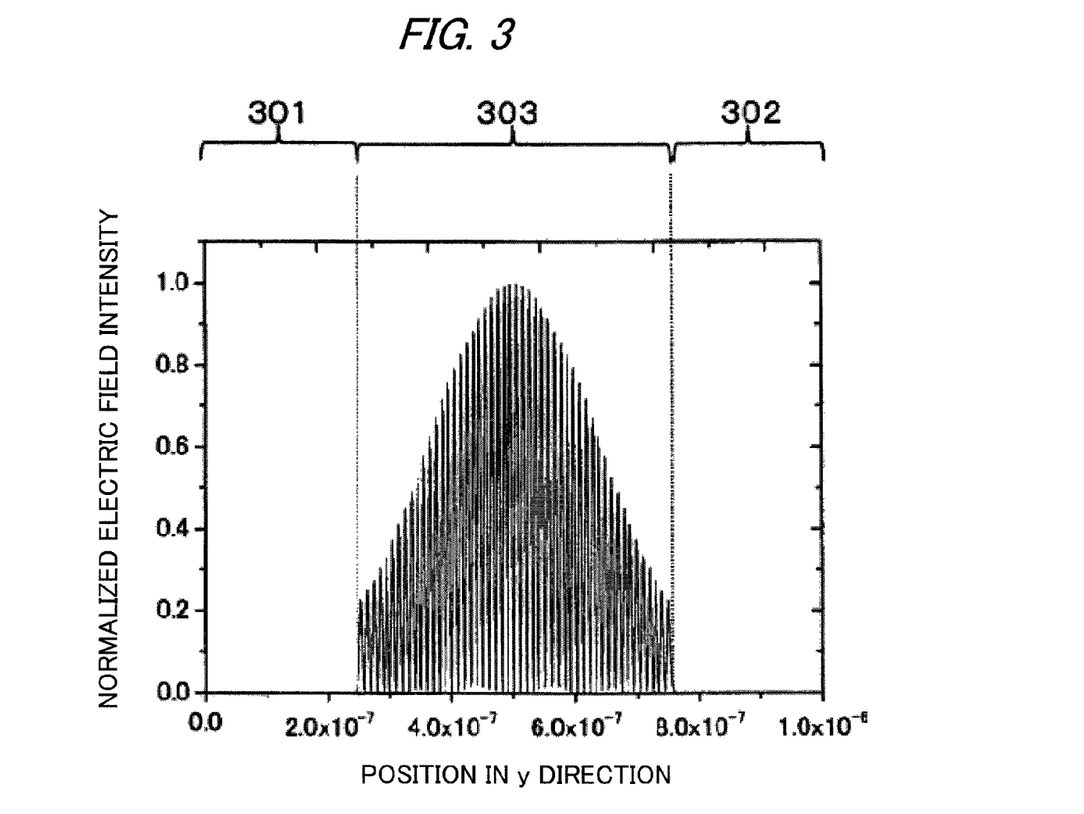
FIG. 3 is a view illustrating the intensity distribution of electric field of a waveguide mode.

In addition, FIG. 3 illustrates the spatial electric field intensity distribution of the periodic resonant waveguide mode 201. In FIG. 3, under the influence of the periodicity in the multilayer film, the entire energy is additionally biased toward the center of the multilayer film as compared with the case of a core as a uniform film having no periodicity. In addition, the amount evanescent field in each cladding reduces, and hence the propagation loss can be reduced. In FIG. 3, the horizontal axis indicates a position in the direction perpendicular to the film surface, that is, the y direction, regions 301 and 302 correspond to the partparts of the Au claddings 101 and 102, and region 303 corresponds to the core 103. In addition, as can be seen from the electric field intensity distribution of the lowest-order periodic resonant waveguide mode 201, the number of local maximums of the electric field intensity coincides with the number of periods of the periodic structure. As a result, an electric field converges on the part of a material that absorbs an X-ray to a small extent in the multilayer film, and hence the loss reduces. In addition, in FIG. 2, no waveguide mode showing an extremely small loss other than the waveguide mode 201 exists in the vicinity of the effective propagation angle of the waveguide mode, and hence the waveguide mode 201 is discriminated from any other waveguide mode and excited with additional ease. As a result, even when a waveguide mode in the vicinity of the effective propagation angle of the waveguide mode 201 is excited, waveguide modes to be obtained are dominantly periodic resonant waveguide mode, each of which is corresponding to the waveguide mode 201, and their characteristics are such that their phases are matched.

Alternatively, the multilayer film of the X-ray waveguide of the present invention can be formed of such multiple materials that the critical angle for total reflection at an interface between the respective layers that form the multilayer film may be larger than the Bragg angle resulting from the periodicity of the multilayer film.

The configuration satisfies the following condition for an X-ray having the energy to be dealt with.

[Math. 7]

$$\theta_{C\_multi} > \theta_B$$

Under the condition, an X-ray confined by the total reflection at the interface between the core and each cladding is further confined in each film by total reflection at each interface in the multilayer film. In the case of the configuration, the total reflection occurs at an interface in the multilayer film. Accordingly, when the number of kinds of materials of which the multilayer film is formed is two, or when the number of the kinds is three or more and the total reflection occurs at each of all interfaces, neither partial reflection nor refraction occurs at an interface in the multilayer film, and hence multiple interference does not occur. Further, when the number of kinds of materials of which the multilayer film is formed is three or more, as long as there is a critical angle for total reflection between the layers in the core, which angle being larger than the Bragg angle, the multiple interference does not occur. As a result, the concept of Bragg reflection as an indication of the periodicity or the concept of such periodic resonant waveguide mode as described above does not hold true. Accordingly, the effective propagation angle of a waveguide mode to be obtained can be an angle deviating from the Bragg angle.

In addition, a waveguide mode present in the core of the configuration is a coupled mode obtained as a result of the coupling of individual waveguide modes confined in the respective films in the multilayer film by an evanescent wave. As a result, even the lowest-order waveguide modes in the core exist in number corresponding to the number of periods of the multilayer film in the vicinity of a specific effective propagation angle. Because the effective propagation angles of those modes are present in a narrow angle range, a waveguide mode to be experimentally obtained is a mixture of those modes, and hence a large energy can be transferred by the multiple modes. In addition, a focused beam or a beam whose angle covers a broad range can be easily coupled to the waveguide because the effective propagation angles of those waveguide modes are distributed in a certain angle range.

Further, an X-ray is confined in each film in the multilayer film, and hence no mode that uses the entire core as a waveguide exists. Accordingly, an unnecessary mode can be eliminated. In the case of the configuration, an absorption loss due to a material reduces because an X-ray is basically confined in each low-loss material by total reflection.

Example 1

Figure 4:
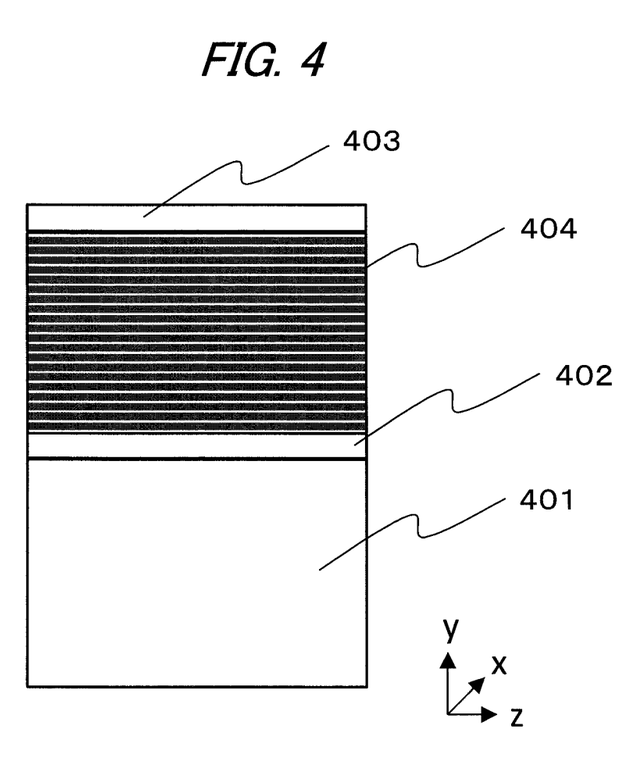
FIG. 4 is a schematic view illustrating an X-ray waveguide of Example 1 of the present invention.

FIG. 4 is a schematic view illustrating an X-ray waveguide of Example 1 of the present invention. A film formed of tungsten on a Si substrate 401 by sputtering is used as a lower cladding 402. A core 404 of a lamellar film as a multilayer film is produced on the cladding by a sol-gel process. Further, an upper cladding 403 is formed by sputtering.

In this example, the inorganic material of a mesostructured film (lamellar film) having a lamellar structure is silicon oxide. A method of producing the lamellar film involves, for example, such steps as described below.

(a) Preparation of solution of precursor for mesostructured film

A silicon oxide mesostructured film having a lamellar structure is prepared by a dip coating method. The solution of the precursor for the mesostructured film is prepared by adding an ethanol solution of a block polymer to a solution described below and stirring the mixture for 3 hours. The solution is obtained by adding ethanol, 0.01 M hydrochloric acid, and tetraethoxysilane and mixing the contents for 20 minutes. The block polymer is ethylene oxide (20) propylene oxide (70) ethylene oxide (20) (hereinafter, represented as EO(20)PO(70)EO(20) (numbers in parentheses, each of which represents the number of repeats of the respective blocks)). Methanol, propanol, 1,4-dioxane, tetrahydrofuran, or acetonitrile can be used instead of ethanol. A mixing ratio (molar ratio) "tetraethoxysilane:hydrochloric acid:ethanol: block polymer:ethanol" is set to 1.0:0.0011:5.2:0.026:3.5. The solution is appropriately diluted before use, for the purpose of adjusting a thickness.

(b) Formation of mesostructured film

A washed substrate is subjected to dip coating with a dip coating apparatus at a lifting speed of 0.5 to 2 $mms^{-1}$. At this time, a temperature is 25° C. and a relative humidity is 40%. After having been formed, a film is held in a thermo-hygrostat at 25° C. and a relative humidity of 50% for 24 hours.

(c) Evaluation

The mesostructured film thus prepared is subjected to X-ray diffraction analysis in a Bragg-Brentano geometry. As a result, it is confirmed that the mesostructured film has high order in the normal direction of the substrate surface and its plane spacing is about 10.24 nm.

The core 404 is interposed between the lower cladding 402 and the upper cladding 403, and an X-ray having a specific energy is confined in the core 404 by total reflection at an interface between the core 404 and the cladding 402 or an interface between the core 404 and the cladding 403. The lamellar film of the core 404 is of a structure obtained by alternately laminating 50 layers, each of which consists of $SiO_2$ having a thickness of about 3.1 nm and the organic material having a thickness of about 7.2 nm, and its period is about 10.24 nm.

With the configuration, a relationship between the period of the multilayer film as the core 404 and the real part of the refractive index of a material that forms the multilayer film satisfies the formula (6). As a result, an X-ray having an energy of 12.4 keV is propagated at an effective propagation angle around a Bragg angle of 0.28° at which the critical angle for total reflection at the interface between the core and each cladding is an angle of about 0.35° or less, and the X-ray is hence confined in the core 404 by the total reflection at the interface between each cladding and the core. In other words, a waveguide mode is excited in the waveguide.

Figure 5:
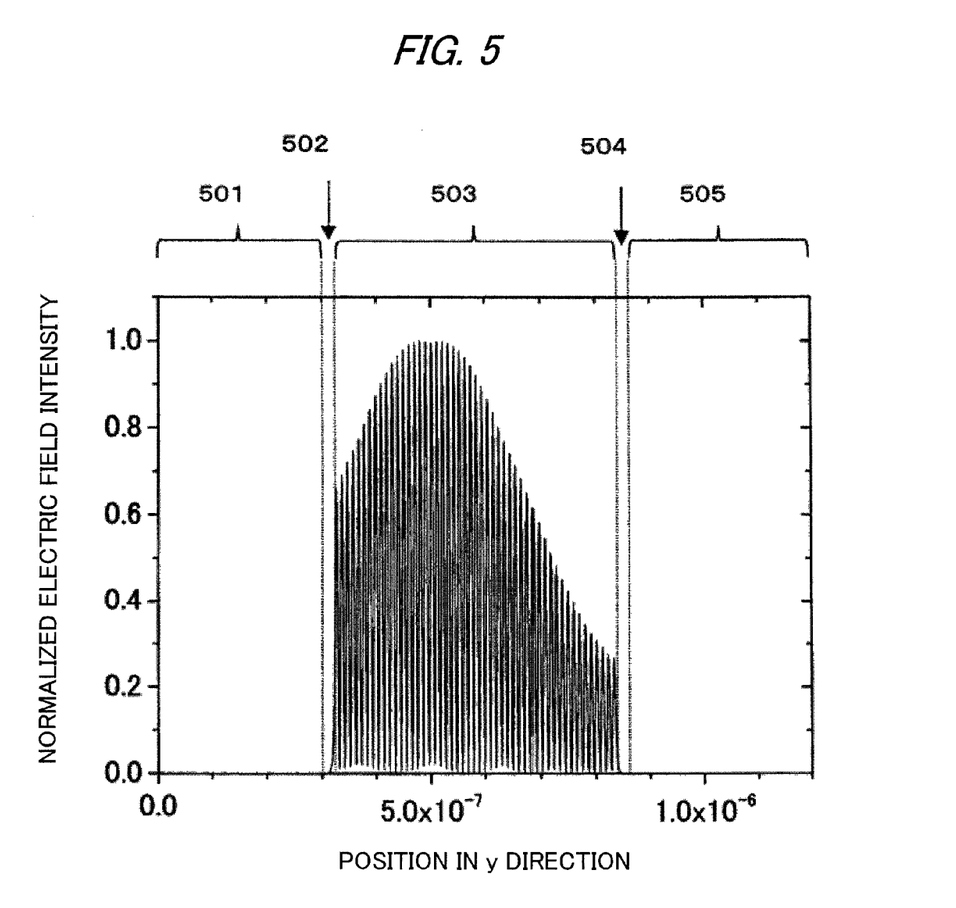
FIG. 5 is a view illustrating the intensity distribution of electric field of a waveguide mode.

The waveguide mode is a periodic resonant waveguide mode obtained as a result of multiple interference in the core. FIG. 5 illustrates the electric field intensity distribution of the periodic resonant waveguide mode. In FIG. 5, a region 501 corresponds to a part of the Si substrate, a region 502 corresponds to the lower cladding, a region 503 corresponds to the core, a region 504 corresponds to the upper cladding, and a region 505 corresponds to a part of air. It can be found that the number of local maximums of the electric field intensity coincides with the number of periods of the multilayer film, and that a value for the electric field intensity increases near the center of the core, though a bias due to the asymmetry of the structure is observed. In addition, the periodic resonant waveguide mode can realize a waveguide having good efficiency because of its small loss.

Example 2

Example 2 of the present invention is such that the core of the X-ray waveguide of Example 1 is changed to a lamellar film whose inorganic material part is titanium oxide. A method of producing a mesostructured film having a lamellar structure as the lamellar film of this example is described below.

(a) Preparation of solution of precursor for mesostructured film

A titanium oxide mesostructured film having a lamellar structure is prepared by a dip coating method. The solution of the precursor for the mesostructured film is prepared by adding an ethanol solution of a block polymer EO(20)PO(70)EO (20) to a solution described below and stirring the mixture for 3 hours. The solution is obtained by adding tetraethoxytitanium to concentrated hydrochloric acid and mixing the contents for 5 minutes. Methanol, propanol, 1,4-dioxane, tetrahydrofuran, or acetonitrile can be used instead of ethanol. A mixing ratio (molar ratio) "tetraethoxytitanium:hydrochloric acid:block polymer:ethanol" is set to 1.0:1.8:0.029:14. The solution is appropriately diluted before use, for the purpose of adjusting a thickness.

(b) Formation of mesostructured film

A washed substrate is subjected to dip coating with a dip coating apparatus at a lifting speed of 0.5 to 2 $mms^{-1}$. At this time, a temperature is 25° C. and a relative humidity is 40%. After having been formed, a film is held in a thermo-hygrostat at 25° C. and a relative humidity of 50% for 2 weeks.

(c) Evaluation

The mesostructured film thus prepared is subjected to an X-ray diffraction analysis in a Bragg-Brentano geometry. As a result, it is confirmed that the mesostructured film has high order in the normal direction of the substrate surface and its plane spacing is about 11 nm.

The critical angle for total reflection at the interface between the core and each of the claddings is about 0.3°, and the Bragg angle resulting from the periodicity of the multilayer film is about 0.19°.

With the configuration of the X-ray waveguide, a periodic resonant waveguide mode having an effective propagation angle around a Bragg angle of about 0.19° can be realized.

INDUSTRIAL APPLICABILITY

The X-ray waveguide of the present invention can be utilized in the field of an X-ray optical technology such as a part or the like for use in an X-ray optical system for operating an X-ray output from a synchrotron or the like, for example, an X-ray optical system in an X-ray imaging technology, an X-ray exposure technology, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-127339, filed Jun. 2, 2010, No. 2011-101309, filed Apr. 28, 2011 which are hereby incorporated by reference herein in their entirety.

REFERENCE SIGNS LIST 101 cladding
102 cladding
103 core
201 point representing lowest-order periodic resonant waveguide mode
202 region corresponding to photonic band gap
203 region representing propagation mode
204 region representing radiation mode

The invention claimed is:

1. An X-ray waveguide, comprising:
a core for guiding an X-ray in such a wavelength band that a real part of the refractive index of materials is 1 or less; and
a cladding for confining the X-ray in the core, wherein:
the core has a one-dimensional periodic structure containing multiple materials having different real parts of the refractive index;
the materials include one of an organic material, a gas, and a vacuum, and an inorganic material; and
the core and the cladding are formed so that critical angle for total reflection at an interface between the core and the cladding is larger than a Bragg angle resulting from a periodicity of the one-dimensional periodic structure.

2. The X-ray waveguide according to claim 1, wherein:
the one-dimensional periodic structure includes a multilayer film; and
the multilayer film is formed so that critical angle for total reflection at an interface between respective layers of the multilayer film is smaller than a Bragg angle resulting from a periodicity of the multilayer film.

3. The X-ray waveguide according to claim 1, wherein:
the one-dimensional periodic structure includes a multilayer film; and
the multilayer film is formed so that critical angle for total reflection at an interface between respective layers of the multilayer film is larger than a Bragg angle resulting from a periodicity of the multilayer film.

4. The X-ray waveguide according to claim 1, wherein the inorganic material comprises an oxide.

5. The X-ray waveguide according to claim 2 or 3, wherein the multilayer film comprises a lamellar film of a mesostructure.

6. The X-ray waveguide according to claim 1, wherein the one-dimensional periodic structure contains a mesoporous material.

7. The X-ray waveguide according to claim 1, wherein a number of periods of the one-dimensional periodic structure is 20 or more.

* * * * *